United States Patent Office 2,882,241
Patented Apr. 14, 1959

2,882,241

REGENERATION OF PLATINUM CATALYST

Charles E. Slyngstad, Rutherford, and William P. Burton, Little Silver, N.J., assignors to The M. W. Kellogg Company, Jersey City, N.J., a corporation of Delaware No Drawing. Application February 10, 1954
Serial No. 409,538

9 Claims. (Cl. 252—419)

This invention relates to an improved method of treating a platinum catalyst containing adsorbed hydrogen and carbonaceous material, and more particularly, it pertains to a method of regenerating a platinum catalyst whereby catalyst life is substantially enhanced over the techniques previously employed for this purpose.

In the regeneration of platinum catalysts which has been previously used, for example, in a hydroforming process, it is important to maintain conditions which are favorable to long life and maintenance of high activity and/or selectivity. In operations involving the use of hydrogen, due to the properties of platinum catalysts, considerable amounts of hydrogen are adsorbed thereby and, notwithstanding various purging treatments, a significant quantity of hydrogen remains adsorbed on the catalyst. It has been found that the presence of adsorbed hydrogen on platinum catalysts may cause difficulty in the regeneration thereof, and further, it can cause significant loss of catalyst life by virtue of the treatments used heretofore in the removal thereof. With respect to regeneration control, it is found that adsorbed hydrogen may cause temperature surges thus resulting in local "hot spots" which adversely influence the activity and/or selectivity of the catalyst thereby reducing its useful life. By means of this invention, a method of regeneration is proposed whereby the loss of catalyst activity due to regeneration is substantially decreased.

It is an object of this invention to provide a method of regenerating a platinum catalyst containing adsorbed hydrogen and carbonaceous material whereby the hydrogen is burned selectively under conditions which are favorable to long catalyst life.

Still another object of this invention is to provide for the regeneration of a platinum catalyst containing adsorbed hydrogen and carbonaceous material whereby the hydrogen and carbonaceous material are removed by combustion under conditions lending to substantially increased catalyst life.

Other objects and advantages of this invention will become apparent from the following explanation and description thereof.

It is contemplated, by means of the present invention, to treat a platinum catalyst containing adsorbed hydrogen and carbonaceous material by the method which comprises contacting the catalyst with a regeneration gas containing about 0.2 to about 2.0% by volume of oxygen, at a temperature of about 400° to about 600° F., for a period of about 10 to about 360 minutes, thereby burning selectively the adsorbed hydrogen from the catalyst, and then removing the carbonaceous material by combustion with an oxygen containing gas under suitable conditions. In another aspect of this invention, the regeneration gas described above and which is employed for burning selectively the hydrogen from the catalyst contains not more than about 2% by volume of water.

In still another aspect of this invention, following the step of removing selectively adsorbed hydrogen from the catalyst, it is then contacted with a regeneration gas containing about 0.2 to about 2.0% by volume of oxygen, at a temperature of about 650° to about 850° F., for a period of about 1 to about 60 hours and thereby removing substantially all of the carbonaceous material. Optionally, the regeneration gas which is employed for the purpose of burning the carbonaceous material contains not more than about 2% by volume of water.

In still another aspect of this invention, the platinum catalyst which has been regenerated so as to be substantially free of adsorbed hydrogen and carbonaceous material is further treated with an oxygen containing gas having an oxygen partial pressure of about 5 to about 200 p.s.i.a., at temperature of about 900° to about 1100° F. and for a period of about 0.5 to about 10 hours. The last treatment serves to rejuvenate the catalyst by restoring the catalyst substantially to its original aciviy and/or selectivity level.

The platinum catalyst to be regenerated by means of the present invention is one which has been previously employed in a process in which combustible or carbonaceous material is deposited thereon, with or without the presence of hydrogen. Following the processing phase of the operation, the catalyst laden with carbonaceous material may be treated or purged with a hydrogen containing gas, hence, prior to the regeneration treatment of this catalyst, it contains carbonaceous material and adsorbed hydrogen. Processes in which the platinum catalyst may contain carbonaceous material as well as adsorbed hydrogen following the reaction phase of the operation are, for example, hydroforming, cracking under hydrogen pressure, hydrodesulfurization, hydrogenation, dehydrogenation, etc., or hydrocarbon conversion processes in general.

A major use of this invention applies with respect to hydroforming wherein a light hydrocarbon oil, e.g., gasoline, naphtha or kerosene, is contacted with the platinum catalyst at a temperature of about 750° to about 1050° F., a pressure of about 25 to about 1000 p.s.i.g., a weight space velocity of about 0.1 to about 15 (determined as the pounds of oil charged to the reaction zone per pound of catalyst present therein), in the presence of added hydrogen in the amount of about 500 to about 15,000 standard cubic feet of hydrogen per barrel of oil feed (standard cubic feet are measured at 60° F. and 760 mm.) designated as SCFB, and in a moving bed system, a catalyst to oil ratio of about 0.01 to about 5.

As a result of being employed in a hydrocarbon conversion process, e.g., hydroforming, the platinum catalyst contains about 1 to about 10% by weight of carbonaceous material and as to the quantity of adsorbed hydrogen, the amount will vary considerably depending upon the type of catalyst employed and the conditions under which the catalyst is used in the conversion of hydrocarbons or purging with hydrogen. The catalyst can be regenerated in accordance with this invention and is prepared by any method involving the deposition of a metallic residue of platinum in finely divided form on a support material. The catalyst can be prepared by combining a platinum compound, e.g., platinum sulfide, chloroplatinic acid, platinum polysulfide, platinum ammine complex, potassium or sodium chloroplatinate, etc., with a suitable carrier material such as, for example, alumino, silica-alumina, silica, zinc spinel, activated charcoal, pumice, kieselguhr, magnesia, alumina-boria, etc., and then decomposing the platinum compound to a metallic residue on the support material. The precursor platinum compound in the carrier material can be combined with the carrier material by impregnation or wet activation which involves employing a solution of the platinum compound for soaking or impregnation of a dried and/or calcined carrier material or combining the carrier material in a hydrous condition with the platinum compound in the form of a solution or slurry. Following the mixing of the two ingredients, the catalyst may be dried at a temperature of about 150° to about 400° F. for a period of about 5 to about 60 hours, or the mixture of ingredients can be calcined, with or without a previous drying operation, at a temperature of about 600° to about 1450° F. for a period of about 1 to about 15 hours. The platinum compound is combined with the support material in amounts suitable for obtaining a finished catalyst containing about 0.01 to about 5% by weight of platinum, based on the total catalyst, more usually, about 0.1 to about 1% by weight of platinum. An excellent catalyst comprises platinum supported on alumina with or without about 1 to about 12% by weight of silica for the purpose of stabilizing the alumina at elevated temperatures.

The platinum catalyst containing adsorbed hydrogen and carbonaceous material is contacted with a regeneration gas containing about 0.2 to about 2% by volume of oxygen, preferably, about 0.2 to about 1% by volume of oxygen. The temperature at which the hydrogen is burned selectively is maintained at a level below which the carbonaceous material ignites, consequently, the hydrogen burning temperature is about 400° to about 600° F., preferably, about 450° to about 575° F. Normally, the carbonaceous material burns at a temperature greater than 600° F., consequently, it is important to maintain the temperature and oxygen concentration below the point at which carbonaceous material burns. The time for burning hydrogen may require from about 10 to about 360 minutes, however, it is preferred that the hydrogen be burned in about 15 to about 140 minutes. The total pressure under which the hydrogen is burned from the platinum catalyst will depend primarily upon the type of system which is used for the regeneration treatment. For example, in a non-regenerative platinum system wherein the catalyst may be used for at least about 3 months before being treated for the removal of carbonaceous material, the regeneration technique may involve a "blocked-out" type of operation. In this system, the oil feed to the catalyst chambers is discontinued and the entire system, including, for example, a plurality of catalyst chambers of at least two to about six reactors, are regenerated at one time. In this type of regeneration system it is not important to maintain the pressure of the reactors being regenerated at essentially the same level at which the reaction takes place. Consequently, a total pressure of about 15 to about 40 p.s.i.a. is usually employed in a blocked-out regeneration system. Another type of regeneration system employed is the "swing" operation. In this type of operation, one or more of the reactors can be processing the oil feed and one or more of the remainder of the reactors can be on regeneration. As one reactor is regenerated, the oil flow to another reactor is discontinued, thus alternating reactors from regeneration to processing cycle as the case requires. In the swing regeneration system, it is preferred to employ a pressure which is higher than that used in the blocked out regeneration system in order to reduce costs of operation, etc. Therefore, in the swing regeneration system, it is preferred to employ a pressure of about 15 to about 265 p.s.i.a., the pressure selected being dependent upon the reaction pressure. For the purpose of burning hydrogen in any kind of system, the pressure can range from about 15 to about 265 p.s.i.a. An important factor in regeneration of platinum catalysts is to maintain the catalyst substantially free of water as much as possible. By virtue of burning hydrogen, the flue gas will contain appreciable quantities of water, therefore, it is of particular importance during the hydrogen burn-out to employ the lowest temperature and pressure possible in order that the catalyst is contacted as much as possible with gases containing a low water partial pressure. As will be shown later, water has a serious adverse effect upon catalyst life and, therefore, its concentration during regeneration should be maintained as low as possible.

Following the selective burning of hydrogen, the catalyst is contacted with a regeneration gas containing about 0.2 to about 2.0% by volume of oxygen, preferably, about 0.2 to about 1% by volume of oxygen. The temperature of regeneration is raised to a range of about 650° to about 850° F., preferably about 700° to about 800° F. The temperature of treatment for this phase of the regeneration is selected on the basis of insuring combustion of the carbonaceous material and of contacting the catalyst with a water atmosphere with as low a temperature as possible. The time required for this phase of the regeneration will depend upon the quantity of carbonaceous material which is present on the catalyst. However, in general, the time of treatment will take about 1 to about 60 hours, more usually, about 1 to about 48 hours. The total pressure under which the second phase of the regeneration takes place falls within the same range as given above in connection with the hydrogen burnout with the same preferred aspects applying insofar as a blocked out or swing regeneration system is concerned.

If the carbonaceous material has been substantially all removed from the platinum catalyst, the system can be optionally treated under severe oxygen conditions for the purpose of restoring substantially all of its original catalytic properties. In this connection, the catalyst substantially free of carbonaceous material and adsorbed hydrogen is contacted with an oxygen containing gas having an oxygen partial pressure of about 5 to about 200 p.s.i.a., preferably, about 14 to about 50 p.s.i.a. The temperature of rejuvenation is in the range of about 900° to about 1100° F., preferably, about 950° to about 1050° F. The period of rejuvenation may vary from about 0.5 to about 10 hours, more usually, about 1 to about 8 hours.

After regeneration, with or without rejuvenation treatment, the catalyst can be pretreated with the hydrogen containing gas at a temperature of about 700° to about 1200° F., preferably, about 800° to about 950° F., for a period of about 1 to about 24 hours, more usually, about 2 to about 12 hours. The hydrogen treatment can take place under the same general and preferred pressures as given hereinabove in connection with the hydrogen burn-out of the catalyst. The hydrogen containing gas can be pure hydrogen or a gas containing about 35 to about 95% by volume of hydrogen.

Another aspect of this invention is concerned with the method by which the regeneration is charged from one phase to another. After the catalyst has been regenerated to remove substantially all of the hydrogen, the temperature of the catalyst is raised to the desired level while using the regeneration gas previously employed for burning hydrogen. The temperature is gradually raised over a period of about 100 to about 900 minutes. After the temperature has been raised to the level for burning carbonaceous material, if desired, the oxygen concentration of the regeneration gas can be increased so as to accelerate the rate of burning carbonaceous material. Following the regeneration of the catalyst by the removal of carbonaceous material, the temperature can be raised to the rejuvenation level over a period of about 2 to about 10 hours. The temperature is first raised in order to insure that any residual carbon which may be on the catalyst will be ignited under conditions lending to better control and thus avoid excessive temperature rises. After the temperature has been raised to the rejuvenation level, the oxygen concentration of the regeneration gas can be increased to the desired value over a period of about 0.25 to about 10 hours. Thereafter, the rejuvenation procedure is conducted for the prescribed period of time.

It was noted hereinabove that the regeneration gas should contain not more than about 2 mol percent of water by virtue that water has a serious adverse effect upon platinum catalyst life. The ideal condition is to remove substantially all of the water from the regeneration gas prior to being introduced into the particular vessel containing the platinum catalyst to be regenerated. At the end of each vessel in which hydrogen or carbonaceous material is being burned, the flue gas should be preferably vented rather than be permitted to flow in contact with other beds of catalyst in successive reactors. In this manner, the catalyst is contacted with water for the shortest period possible during regeneration. In general, it involves a great deal of expense to remove substantially all of the water from the regeneration gas prior to being used for the burning step, consequently, it is desirable that the regeneration gas contain a dew point of about −60° to about 40° F. and preferably, from the standpoint of economics, a dew point of about 0° to about 32° F. The description of the regeneration gas with respect to water content applies to all phases of regeneration, namely, hydrogen burn-out, carbon burn-out and rejuvenation.

The regeneration procedure of this invention is effective in fixed or moving bed systems in which the catalyst is of a fluid or non-fluid type. In a fixed bed system, it is contemplated employing at least one reactor or a series of reactors totaling up to about six reactors. Suitable reheating of the reactant material which leaves each reactor commencing with the initial one is employed in order to effect maximum efficiency with respect to catalyst utilization.

Further, the catalyst beds in the respective reactors can be arranged such that the last reactor contains the larger volume of catalytic material and the preceding reactors contain equal volumes of catalyst or successively larger volumes thereof. This arrangement provides for improved utilization of the catalyst. In a fixed bed system, the catalyst is usually employed in the form of extruded pills having a diameter ranging $1/32$ to about $3/16$ of an inch and a length of about $1/4$ of an inch to about $1/2$ inch. In the moving bed system, preferably using a finely divided catalytic material having a particle size of about 1 to about 250 microns, the catalyst is passed through successive zones wherein the various phases of reaction are effected.

In order to understand more fully the present invention, specific examples are given below.

In the table below, inspections are given for the naphtha employed.

Table I

ASTM distillation, ° F.:
IBP, vol. percent _____ 222
10 _____ 251
50 _____ 296
90 _____ 337
E.P. _____ 378
API° gravity _____ 54.2
Vol. percent aromatics _____ 7.6
Bromine No. _____ 0.7
Percent sulfur _____ 0.014
Molecular weight _____ 124

The above naphtha was processed over catalysts comprising about 0.6% by weight of platinum supported on alumina. The hydroforming conditions are given below.

Table II

Temperature, ° F. _____ 940
Pressure, p.s.i.g. _____ 200
Space vel., $W_o/hr./W_c$ _____ 44
Recycle $H_2$ rate, mols/mol feed _____ 3
Reaction period, hrs. _____ 16

As a result of the hydroforming operation, the catalyst became contaminated with carbonaceous material in the amount of about 5% by weight. These catalysts were regenerated under the conditions given in Table III below, and the activity lost by virtue of the regeneration, determined by passing the naphtha given in Table I under the conditions listed in Table II, is also listed therein.

Table III

| Run No. | 1 | 2 | 3 |
|---|---|---|---|
| Hydrogen Burn-out: | | | |
| Temperature, ° F. | 500 | 500 | 500 |
| Pressure, p.s.i.a. | Atm. | Atm. | Atm. |
| Regeneration gas, Vol. Percent $O_2$ | 0.5 | 0.5 | 0.5 |
| Time, minutes | 15 | 15 | 15 |
| Carbon Burn-out: | | | |
| Temperature, ° F. | 800 | 800 | 800 |
| Pressure, p.s.i.a. | Atm. | Atm. | Atm. |
| Regeneration gas, Vol. Percent $O_2$ | 0.5 | 0.5 | 0.5 |
| Time, hours | 1.15 | 1.15 | 1.15 |
| Rejuvenation: | | | |
| Temperature, ° F. | 1,000 | 1,000 | 1,000 |
| Pressure, p.s.i.a. | Atm. | 250 | Atm. |
| Regeneration gas, Vol. Percent $O_2$ | 21 | 21 | 21 |
| Mol percent water in regeneration gas | 0 | 0 | 2 |
| Percent of initial activity lost | 3.4 | 2.3 | 10.2 |

In the case of a regeneration procedure involving a temperature of about 800° F. for the burning of adsorbed hydrogen and carbonaceous material, under other comparable conditions as in run No. 1, the activity lost due to regeneration on a percentage basis was 7%.

It is to be noted from the data contained in Table III that the loss in activity is reduced substantially by employing an initial burn-out of hydrogen at a relatively low pressure and temperature and then followed with an operation in which the carbonaceous material is burned at a temperature and pressure suitable for maintenance of catalyst activity. Further, it should be noted by comparison of runs 1 and 2 that the rejuvenation step decreases significantly the loss of activity. A comparison between runs 1 and 3 clearly indicates that water has a serious adverse effect upon catalyst activity.

Having thus provided a description of the present invention along with specific examples thereof, it should be understood that no undue limitations or restrictions are to be imposed by reason thereof, but that the scope of the present invention is defined by the appended claims.

We claim:
1. A process for treating a platinum catalyst containing adsorbed hydrogen and carbonaceous material which comprises contacting said catalyst with a regeneration gas containing about 0.2 to about 2.0% by volume of oxygen, at a temperature of about 400° to about 600° F., for a period of about 15 to about 360 minutes, thereby burning selectively the hydrogen from the catalyst and then removing the carbonaceous material by combustion with an oxygen containing gas under suitable conditions.

2. A process for treating a platinum catalyst containing adsorbed hydrogen and carbonaceous material which comprises contacting said catalyst with a regeneration gas containing about 0.2 to about 2.0% by volume of oxygen, at a temperature of about 400° to about 600° F., for a period of about 15 to about 360 minutes, thereby selectively burning the hydrogen, then contacting the catalyst containing carbonaceous material with a regeneration gas containing about 0.2 to about 2.0% by volume of oxygen at a temperature of about 650° to about 850° F., for a period of about 1 to about 60 hours, and thereby removing substantially all of the carbonaceous material.

3. The process of claim 2 which is further characterized by contacting the platinum catalyst substantially free of carbonaceous material with a rejuvenation gas containing oxygen with a partial pressure of about 5 to about 200 p.s.i.a. for a period of up to about 10 hours.

4. A process for treating a platinum catalyst containing adsorbed hydrogen and carbonaceous material which comprises contacting said catalyst with a regeneration gas containing about 0.2 to about 2.0% by volume of oxygen and which contains not more than about 2% by volume of water, at a temperature of about 400° to about 600° F., for a period of about 15 to about 360 minutes, thereby burning selectively the hydrogen from the catalyst, and then removing the carbonaceous material by combustion with an oxygen containing gas.

5. The process of claim 4 wherein the regeneration gas is substantially free of water.

6. A process for treating a platinum catalyst containing adsorbed hydrogen and carbonaceous material which comprises contacting said catalyst with a regeneration gas containing about 0.2 to about 1.0% by volume of oxygen and which contains not more than about 2% by volume of water, at a temperature of about 450° to about 575° F., for a period of about 15 to about 140 minutes, thereby burning selectively the hydrogen from the catalyst, then contacting the catalyst containing carbonaceous material with a regeneration gas containing about 0.2 to about 1.0% by volume of oxygen and which contains not more than about 2% by volume of water, at a temperature of about 700° to about 800° F., for a period of about 1 to about 48 hours, and thereby removing substantially all of the carbonaceous material.

7. The process of claim 6 which is further characterized by contacting the platinum catalyst substantially free of carbonaceous material with a rejuvenation gas containing oxygen with a partial pressure of about 14 to about 50 p.s.i.a., and which contains not more than about 2% by volume of water, at a temperature of about 950° to about 1050° F., for a period of about 1 to about 8 hours.

8. A process for treating a platinum catalyst containing adsorbed hydrogen and carbonaceous material which comprises contacting said catalyst with a regeneration gas containing between about 0.2 and about 1.0 percent by volume of oxygen at a temperature between about 400 and about 600° F. for a period between about 15 and about 360 minutes thereby burning selectively the hydrogen from the catalyst and then removing carbonaceous material by contact with an oxygen-containing gas under conditions suitable for combustion.

9. A process for treating a platinum catalyst containing adsorbed hydrogen and carbonaceous material which comprises contacting said catalyst with a regeneration gas containing between about 0.2 and about 1.0 percent by volume of oxygen at a temperature between about 400 and about 600° F. for a period between about 15 and about 360 minutes thereby selectively removing hydrogen, then contacting said catalyst containing carbonaceous material with a regeneration gas containing between about 0.2 and about 1.0 percent by volume of oxygen at a temperature between about 650 and about 850° F. for a period between about 1 and about 60 hours thereby removing substantially all of said carbonaceous material.

References Cited in the file of this patent
UNITED STATES PATENTS

| Number | Name | Date |
|---|---|---|
| 2,461,838 | Neuhart | Feb. 15, 1949 |
| 2,641,582 | Haensel | June 9, 1953 |
| 2,664,404 | Blatz et al. | Dec. 29, 1953 |
| 2,752,288 | Voorhies et al. | June 26, 1956 |